United States Patent
Finn et al.

(10) Patent No.: US 9,675,920 B2
(45) Date of Patent: Jun. 13, 2017

(54) APPARATUS FOR AIR PRECLEANER AND PRECLEANER

(71) Applicant: CATERPILLAR INC., Peoria, IL (US)

(72) Inventors: Timothy S. Finn, Peoria Heights, IL (US); Shawn M. Ryon, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 175 days.

(21) Appl. No.: 14/578,116

(22) Filed: Dec. 19, 2014

(65) Prior Publication Data
US 2016/0177893 A1    Jun. 23, 2016

(51) Int. Cl.
| | |
|---|---|
| *B01D 46/42* | (2006.01) |
| *F02M 35/08* | (2006.01) |
| *F02M 35/02* | (2006.01) |
| *F02M 35/024* | (2006.01) |
| *F02M 35/022* | (2006.01) |
| *B01D 50/00* | (2006.01) |
| *F02M 35/16* | (2006.01) |
| *B01D 45/16* | (2006.01) |

(52) U.S. Cl.
CPC ......... *B01D 46/4272* (2013.01); *B01D 45/16* (2013.01); *B01D 50/002* (2013.01); *F02M 35/024* (2013.01); *F02M 35/0216* (2013.01); *F02M 35/0223* (2013.01); *F02M 35/084* (2013.01); *F02M 35/086* (2013.01); *F02M 35/16* (2013.01)

(58) Field of Classification Search
CPC  B01D 46/0087; B01D 46/4272; B01D 45/16; F02M 35/0209; F02M 35/0223; F02M 35/08; F02M 35/084; F02M 35/086
See application file for complete search history.

(56) References Cited

U.S. PATENT DOCUMENTS

| | | |
|---|---|---|
| 2,882,881 A | 4/1959 | Nedley |
| 5,821,475 A | 10/1998 | Morehead et al. |
| 7,069,919 B1 | 7/2006 | Atkinson et al. |
| 7,311,740 B2 * | 12/2007 | Williams et al. ..... F16K 15/038 137/512.1 |
| 7,484,491 B2 | 2/2009 | Arruda et al. |
| 8,177,872 B2 | 5/2012 | Nelson et al. |
| 8,770,166 B2 | 7/2014 | Tucker |
| 8,826,879 B2 | 9/2014 | Lee |

(Continued)

FOREIGN PATENT DOCUMENTS

EP    2 251 074 B1    12/2011

*Primary Examiner* — Robert Clemente
(74) *Attorney, Agent, or Firm* — Finnegan, Henderson, Farabow, Garrett & Dunner, LLP

(57) ABSTRACT

An apparatus for partially blocking airflow in a precleaner for an internal combustion engine may include a stationary barrier configured to be mounted in a precleaner. The apparatus may further include a movable barrier coupled to the stationary barrier and configured to move between an open position and a closed position in response to changes in an air flow rate through the precleaner. When the air flow rate through the precleaner reaches a threshold air flow rate, the movable barrier may move from the closed position toward the open position, and when the air flow rate through the precleaner drops below the threshold air flow rate, the movable barrier may move from the open position toward the closed position.

11 Claims, 8 Drawing Sheets

(56) References Cited

U.S. PATENT DOCUMENTS

| | | |
|---|---|---|
| 2003/0230272 A1 | 12/2003 | Stuart |
| 2004/0055814 A1 | 3/2004 | Chae et al. |
| 2011/0048368 A1* | 3/2011 | Nelson .................. B01D 45/04 123/198 E |
| 2012/0272630 A1 | 11/2012 | James |
| 2013/0152895 A1 | 6/2013 | Yasuda |
| 2014/0260129 A1 | 9/2014 | Rosenfeld et al. |

* cited by examiner

APPARATUS FOR AIR PRECLEANER AND PRECLEANER

TECHNICAL FIELD

The present disclosure is directed to an apparatus for use with a precleaner and a precleaner and, more particularly, to an apparatus for use with an intake air precleaner and an intake air precleaner for use with an internal combustion engine.

BACKGROUND

Machines used in the farming, construction, mining, power generation, and other similar industries commonly include a frame that supports an internal combustion engine, a work tool movably coupled to the frame, and at least one actuator coupled to the work tool and supplied with power by the engine. Such machines typically operate in harsh, dusty environments characterized by large amounts of airborne debris, such as dust and dirt. In such environments, it is desirable to remove the debris from the air before directing the air to the engine, so that the debris does not reduce the service life of the engine. To assist with this process, such machines typically include an intake air filter or other similar air cleaner configured to remove debris from the air upstream of the air intake of the engine. Further, to assist in prolonging the useful life of such air cleaners, some machines may also include a precleaner configured to remove relatively large debris from the air prior to cleaning the intake air with the air cleaner.

Some precleaners may include separators through which portions of the air enter the precleaner, and which use the air flow to separate the debris from the air. However, such separators may be designed to be effective at a particular air flow rate corresponding to operation of the engine at a relatively elevated output and a corresponding relatively high air flow rate into the intake of the engine. Thus, the separators may not be as effective at separating the debris from the air when the engine is operated at an output below the relatively elevated output. Thus, it may be desirable to increase the effectiveness of a precleaner at removing debris from intake air when an engine is operated at a relatively reduced output corresponding to a relatively reduced flow rate through the separators.

An example of an air induction tuning unit is described in U.S. Pat. No. 8,770,166 B2 to Tucker ("the '166 patent"). According to the '166 patent, a method and apparatus are provided for an air inlet duct of an internal combustion engine. The air inlet duct includes a tubular housing, and an inner wall has a plurality of perforations. The inner wall of the '166 patent is disposed within the tubular housing, such that the tubular housing includes at least two flow passages. A valve set is associated with a first flow passage of the at least two flow passages, and the valve set selectively controls airflow through the first flow passage, such that the first flow passage functions in at least one of a pass-through mode and a tuning mode.

Although the '166 patent purports to provide an air induction system that can respond to changes in engine load demands, it does not relate to improving the effectiveness of removing debris from air entering an intake air passage during changing outputs of an engine. The apparatus and precleaner disclosed herein may be directed to mitigating or overcoming one or more of the possible drawbacks set forth above.

SUMMARY

According to a first aspect, an apparatus for partially blocking airflow in a precleaner for an internal combustion engine may include a stationary barrier configured to be mounted in a precleaner. The apparatus may further include a movable barrier coupled to the stationary barrier and configured to move between an open position and a closed position in response to changes in an air flow rate through the precleaner. When the air flow rate through the precleaner reaches a threshold air flow rate, the movable barrier may move from the closed position toward the open position, and when the air flow rate through the precleaner drops below the threshold air flow rate, the movable barrier may move from the open position toward the closed position.

According to a further aspect, a precleaner for an internal combustion engine may include a sleeve configured to be coupled to an intake conduit associated with an internal combustion engine. The precleaner may also include a separator panel coupled to the sleeve and configured to separate debris from air flowing through the separator panel and into the intake conduit. The precleaner may further include a cover coupled to the sleeve, and an apparatus for partially blocking airflow in the precleaner. The apparatus may include a stationary barrier mounted in the precleaner, and a movable barrier coupled to the stationary barrier and configured to move between an open position and a closed position in response to changes in an air flow rate of air passing through the precleaner. When the movable barrier moves from the open position toward the closed position, flow of air through a first portion of the separator panel may be reduced, and an air flow rate of air passing through a second portion of the separator panel may be increased. When the movable barrier moves from the closed position toward the open position, an air flow rate of air passing through the first portion of the separator panel may be substantially the same as the air flow rate of air passing through the second portion of the separator panel.

According to another aspect, a method for removing debris from an air flow entering an intake conduit of an internal combustion engine may include flowing the air flow through a separator panel configured to separate debris from the air flow, and reducing flow of air through a first portion of the separator panel to increase flow of air through a second portion of the separator panel. The method may also include separating debris from the air flowing through the second portion of the separator panel, and removing the debris from the separator panel via a scavenge port.

DETAILED DESCRIPTION

Precleaners may be used for removing relatively larger debris, such as dust and dirt, from air entering an internal combustion engine via, for example, an air cleaner. The precleaner removes the relatively larger particles prior to the air entering the air cleaner, which may prevent damage to the air cleaner and/or prolong the service life of the air cleaner. Engines may be used to supply power for machines, such as, for example, any type of ground-borne vehicle, such as an automobile, a truck, an agricultural vehicle, and/or a construction vehicle, such as, for example, a wheel loader, a dozer, a track-type tractor, an excavator, a grader, an on-highway truck, an off-highway truck, and/or any other vehicle type known to a person skilled in the art. In addition, engines may supply power to any stationary machines, such as, for example, a genset for generating electric power or a pump for pumping a fluid such as water, natural gas, or petroleum. Engines may take the form of, for example, reciprocating-piston internal combustion engines, such as spark-ignition engines or compression-ignition engines, rotary engines, gas turbine engines, and/or engines powered by gasoline, diesel fuel, bio-diesel, ethanol, methanol, and combinations thereof.

Figure 1:
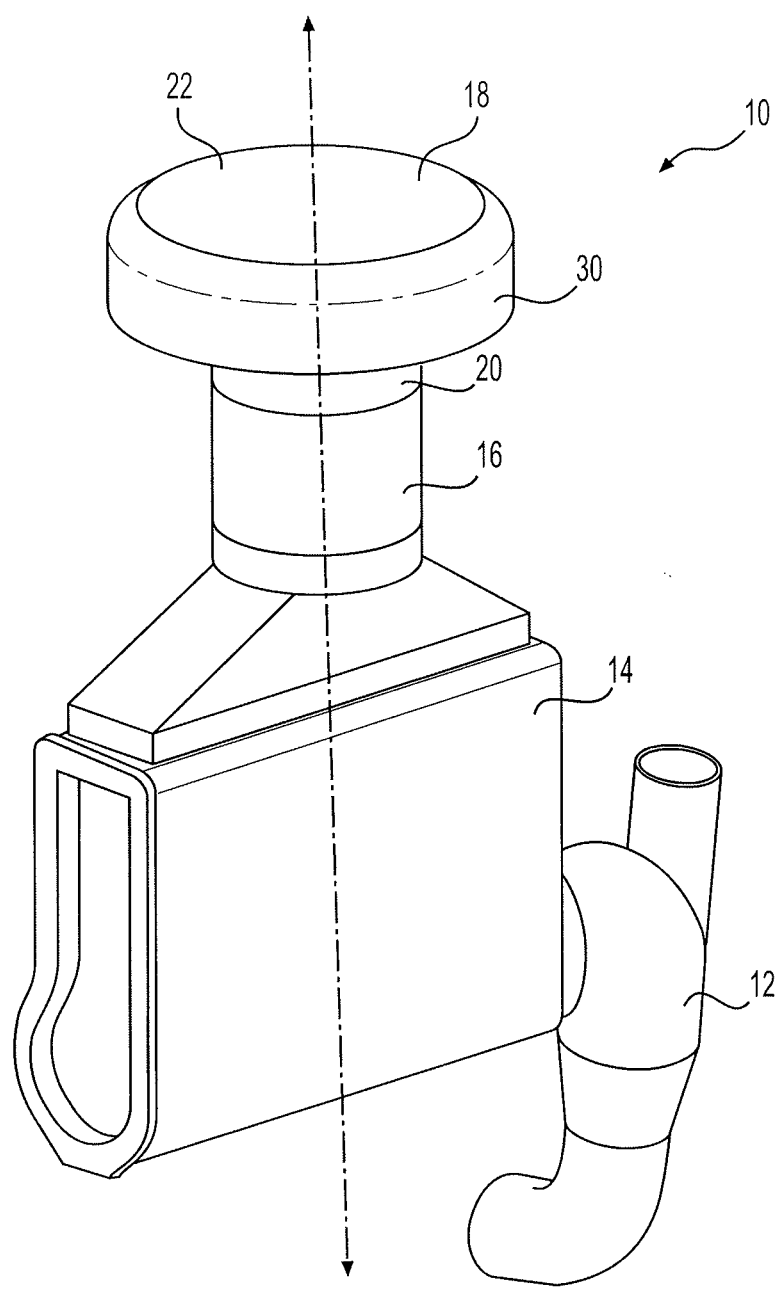
FIG. 1 is a schematic perspective view of an exemplary embodiment of an intake system for an internal combustion engine.

As shown in FIG. 1, an exemplary air intake system 10 for an internal combustion engine may include an intake passage 12 for supplying air to the engine. The intake air is drawn through intake passage 12 and into the engine to mix with fuel and assist with combustion in a combustion chamber. In order to clean the air prior to entering the combustion chamber, exemplary air intake system 10 includes an air cleaner 14 and an intake conduit 16. In operation, air is drawn via operation of the engine into intake conduit 16, which is in flow communication with air cleaner 14, where relatively small particulates may be removed from the intake air prior to entering intake passage 12 and the combustion chamber of the engine. In the exemplary embodiment shown in FIG. 1, air intake system 10 includes a precleaner 18 configured to separate relatively larger debris from the intake air prior to entering air cleaner 14 for removal of relatively smaller particulates from the intake air.

Figure 2:
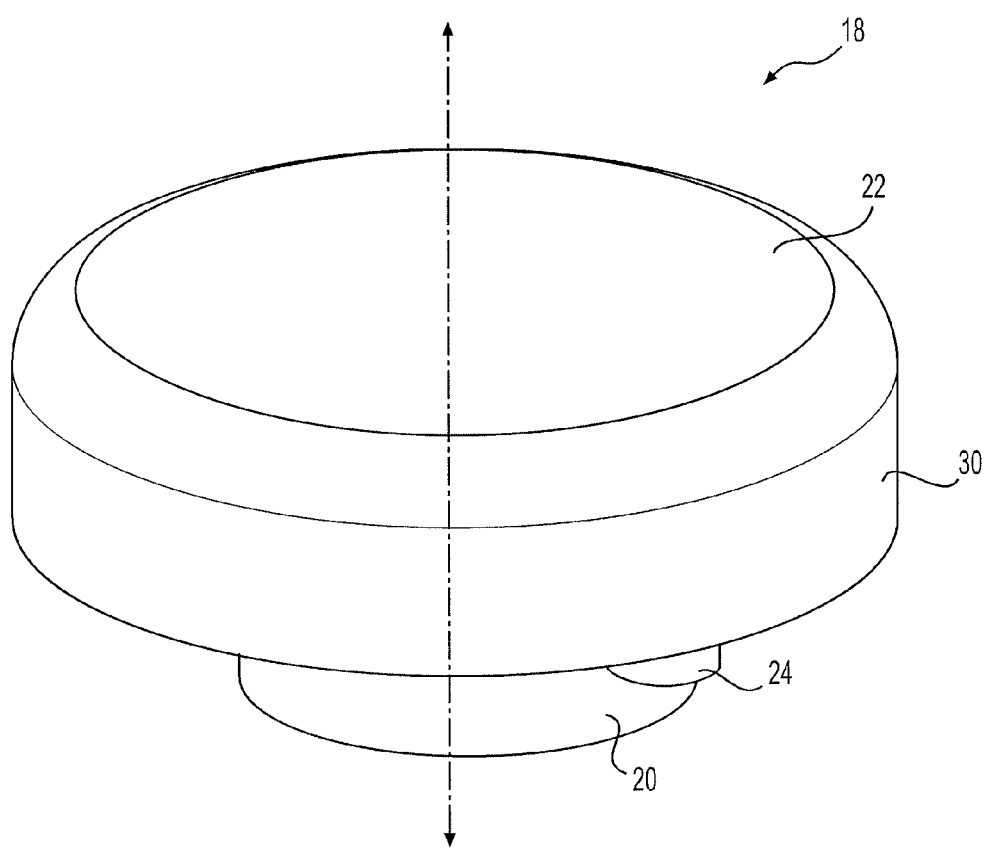
FIG. 2 is a schematic perspective view of an exemplary embodiment of a precleaner for a machine.

As shown in FIGS. 1 and 2, exemplary precleaner 18 includes a sleeve 20 coupled to intake conduit 16, for example, in a relatively tightly fitted manner around an outer surface of intake conduit 16. Exemplary precleaner 18 also includes a cover 22 coupled to and covering an open end of sleeve 20, and being configured to prevent fluids and debris from falling into sleeve 20 and advancing to intake conduit 16 and air cleaner 14. In the exemplary embodiment shown, precleaner 18 also include a scavenge port 24 configured to facilitate removal of debris separated from the intake air by precleaner 18.

Figure 3:
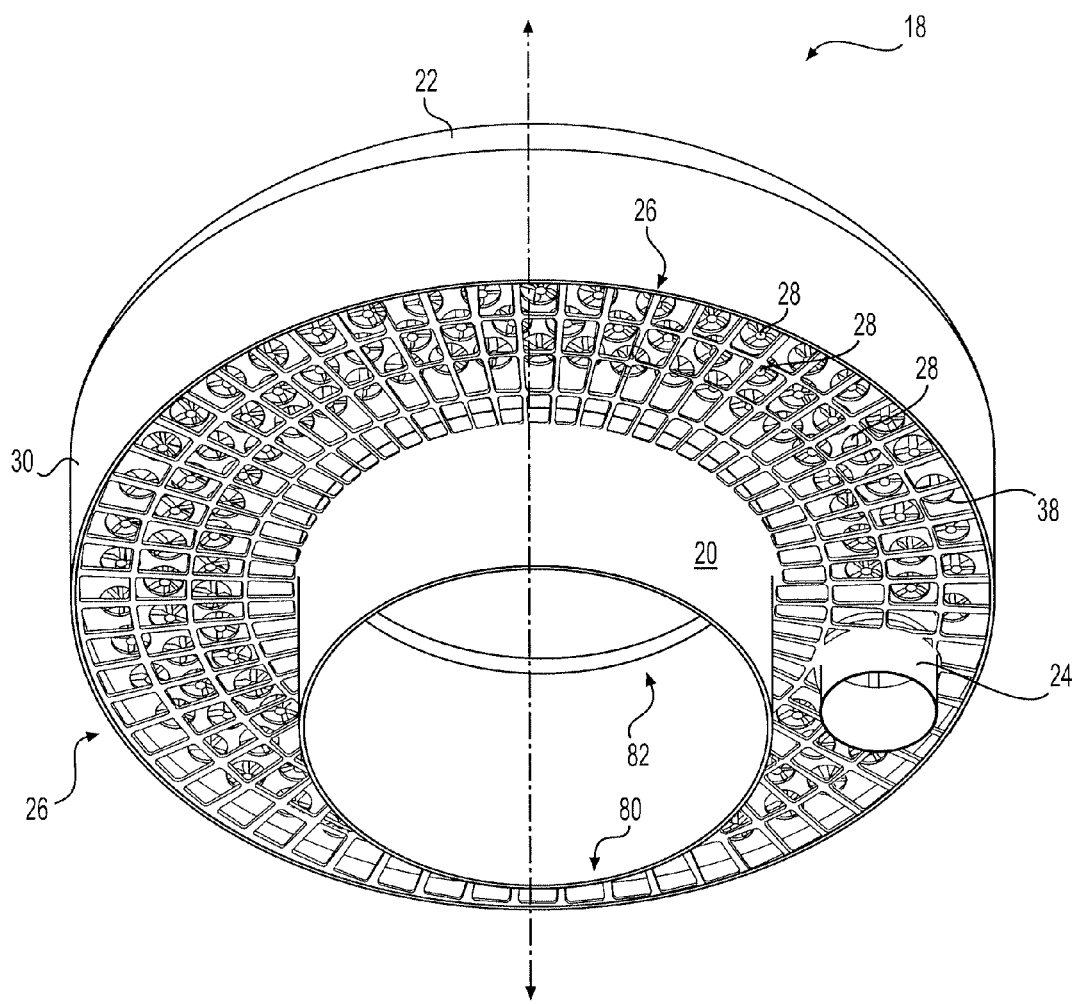
FIG. 3 is a schematic perspective view of an underside of the exemplary embodiment of precleaner shown in FIG. 2.
Figure 4:
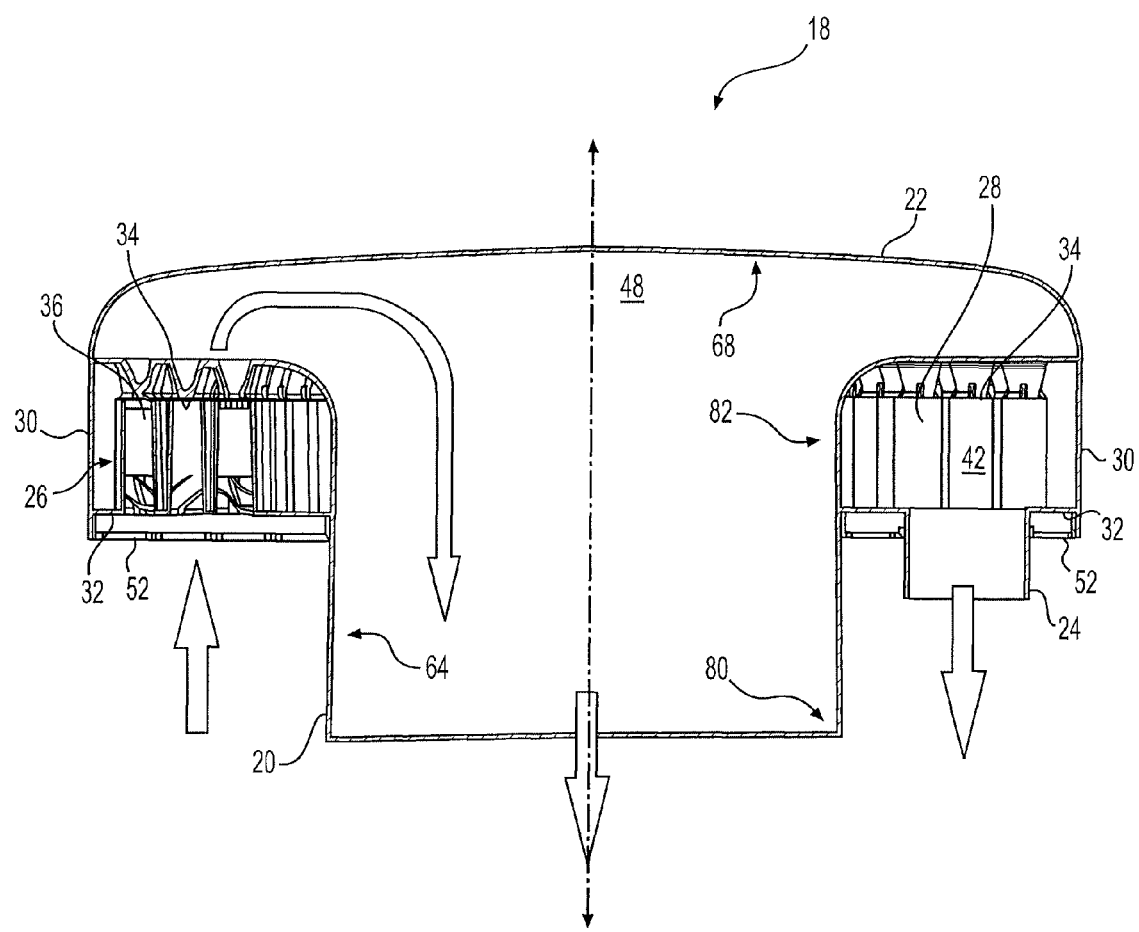
FIG. 4 is a partial section, side view of the exemplary embodiment of precleaner shown in FIG. 2.
Figure 5:
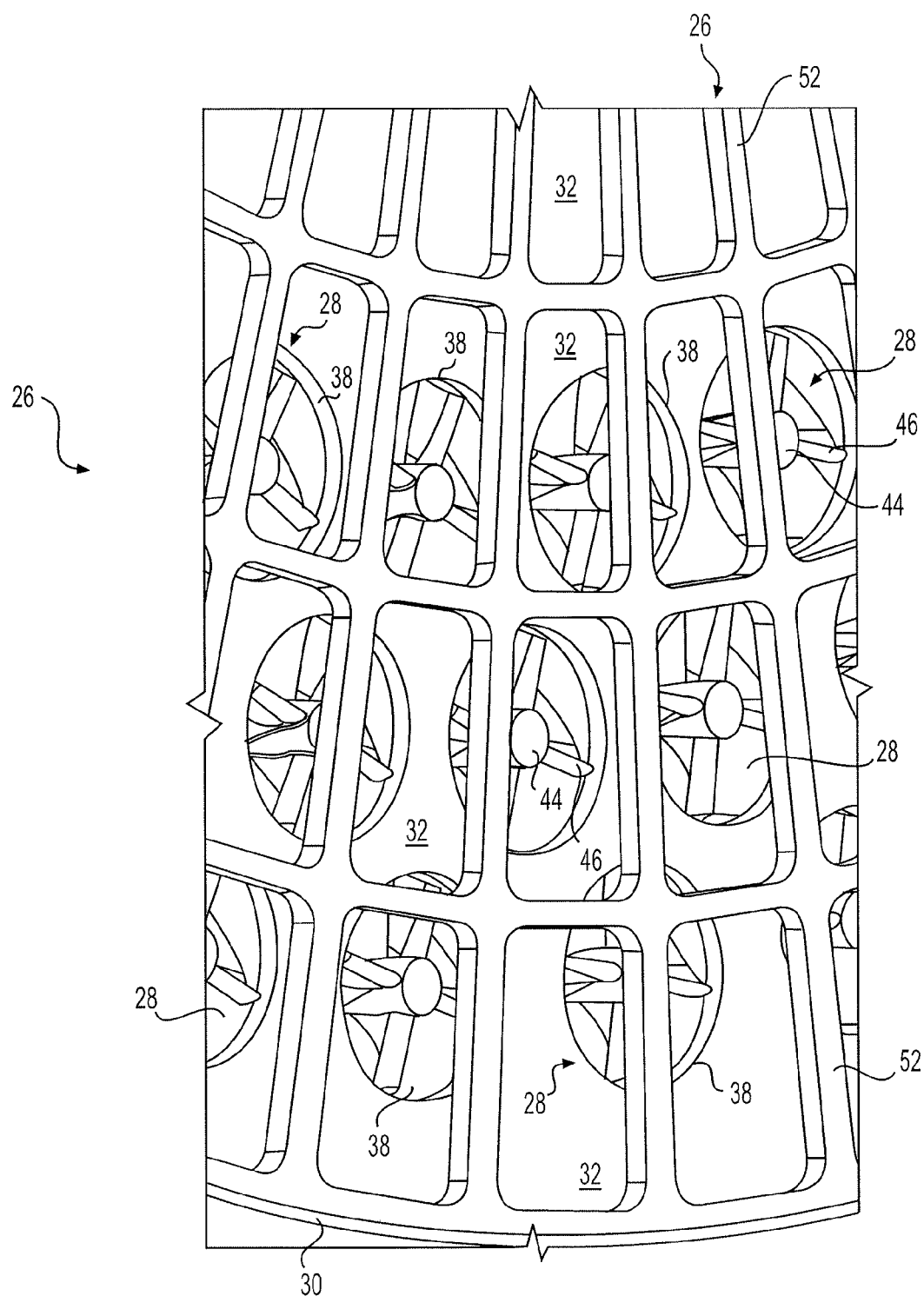
FIG. 5 is a partial perspective view of the underside of the exemplary embodiment of precleaner shown in FIG. 2.

As shown in FIGS. 3 and 4, exemplary precleaner 18 includes a separator panel 26 configured to separate debris from the intake air as it passes through separator tubes 28 in separator panel 26. For example, separator panel 26 has an outer periphery coupled to a relatively vertical portion of a flange 30 extending around the outer periphery of cover 22. An inner portion of separator panel 26 is coupled to sleeve 20, such that intake air entering sleeve 20 first passes through separator tubes 28 of separator panel 26 before passing into sleeve 20, intake conduit 16, and air cleaner 14.

As shown in FIG. 4, separator panel 26 includes a lower face 32 and an upper face 34 separated by a chamber 36 configured to receive debris separated from the intake air as it passes through separator tubes 28. Chamber 36 is in flow communication with scavenge port 24, so that debris entering chamber 36 via separator tubes 28 may be removed via scavenge port 24.

Figure 6:
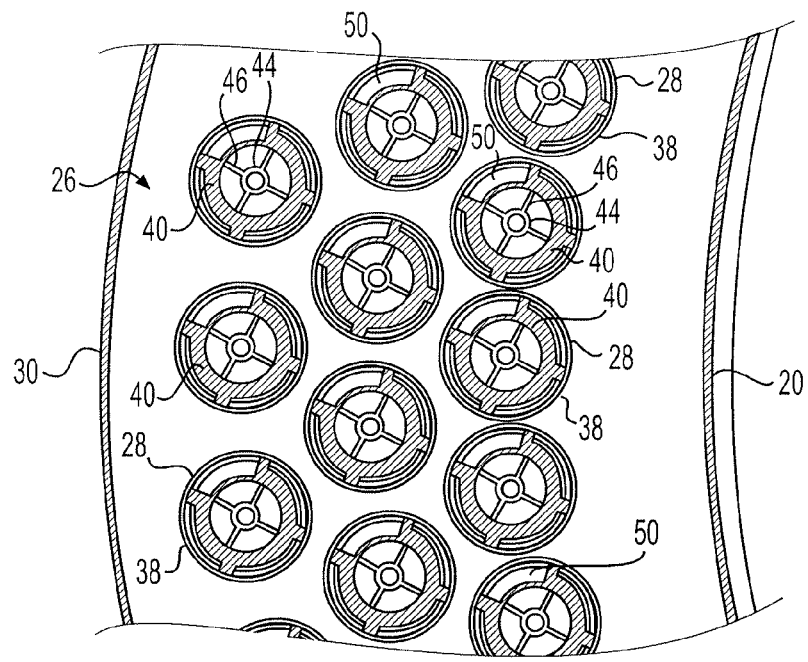
FIG. 6 is a partial bottom view of the exemplary embodiment of precleaner shown in FIG. 2.
Figure 7:
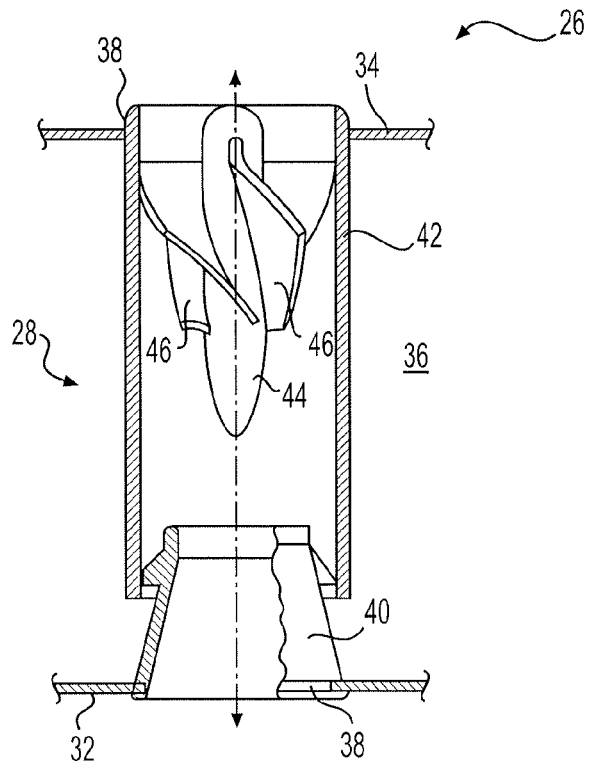
FIG. 7 is a partial section, side view of an exemplary embodiment of a separator tube of an exemplary precleaner.
Figure 8:
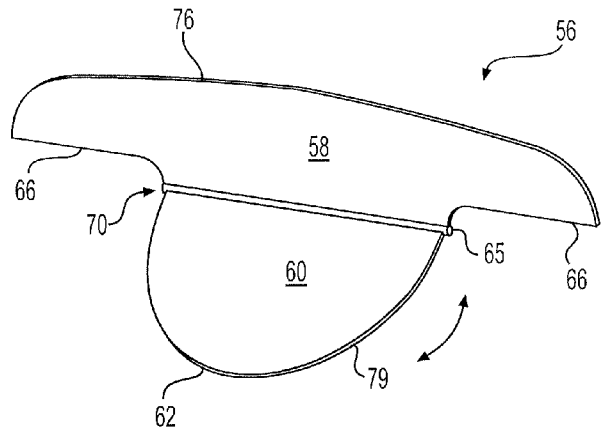
FIG. 8 is a perspective view of an exemplary embodiment of an apparatus for partially blocking air flow in a precleaner.

As shown in FIGS. 4-7, lower face 32 and upper face 34 each include corresponding apertures 38 coupled to one another via respective separator tubes 28 (see FIG. 7). In the exemplary embodiment shown in FIG. 7, separator tubes 28 include a nozzle 40 coupled to lower face 32 at corresponding aperture 38, and a tubular extension 42, which, in turn, is coupled to upper face 34 at corresponding aperture 38. Exemplary separator tubes 28 also include a vane support 44 supporting vanes 46 configured to cause air passing through separator tubes 28 to swirl within extension 42 of chamber 48. For example, vanes 46 may extend longitudinally down vane support 44 in a substantially helical manner and as air flows through separator tube 28, vanes 46 deflect the air to promote swirl.

As shown in FIG. 6, separator tubes 28 include apertures 50 located at a radially outer position in separator tubes 28 and at a location close to the end of extension 42 adjacent upper face 34. Apertures 50 are in flow communication with chamber 36 between lower face 32 and upper face 34, and thus, as the air swirls, debris is propelled radially outward within extension 42, exits separator tube 28 via aperture 50, and enters chamber 36, which is in flow communication with scavenge port 24. Thus, debris entering chamber 36 via apertures 50 may be removed from chamber 36 via scavenge port 24, such that debris does not enter sleeve 20 or intake passage 12. Thus, the debris separated from the air passing through separator panel 26 is substantially prevented from entering air cleaner 14.

According to some embodiments, precleaner 18 may include a mesh or screen 52 substantially covering lower face 32 of separator panel 26. Screen 52 may be sized to prevent relatively larger debris from entering separator panel 26.

In operation, the internal combustion engine draws air into its combustion chambers via air intake system 10. Air from the surroundings first enters precleaner 14, which serves to remove relatively larger debris. According to the exemplary embodiment shown in FIGS. 1-7, the air passes through separator panel 26, where separator tubes 28 separate debris from the air, for example, as a result of vanes 46 causing air to swirl in separator tubes 28, so that debris is propelled out apertures 50 and into chamber 36. Once in chamber 36, the debris may be removed via scavenge port 24. Air passing through separator ports 28 is received in an upper chamber 54 (see FIG. 4) and thereafter flows (downward as shown) through sleeve 20 and into intake conduit 16 and air cleaner 14, where additional, relatively smaller particulates may be removed from the intake air prior to entering intake passage 12 and flowing to the intake of the engine to be used for combustion.

According to some embodiments, the effectiveness of separator tubes 28 in separating debris from the air passing through separator panel 26 may depend in part on the air flow rate of air through separator tubes 28. For example, the swirl promoted by vanes 46 may depend in part on the velocity or flow rate of the air. Thus, separator tubes 28 including vanes 46 may be configured to be most effective when the engine is operating a relatively high output (e.g., at rated output), which corresponds to a relatively high air flow rate for air passing through separator tubes 28. If, however, the engine is idling or operating at a relatively lower output (e.g., lower than rated output), the air flow rate of air passing through separator tubes 28 may be insufficient for separator tubes 28 including vanes 46 to separate debris from the air to a desirable degree.

According to some embodiments, exemplary precleaner 18 may be provided with an apparatus 56 configured to partially block airflow in precleaner 18, as shown in FIGS. 8-11. This may serve to increase the effectiveness of the separation of debris from the air as it passes through separator panel 26. For example, for a given volume of air being drawn into air intake system 10, by blocking or preventing air from passing through a first portion 57 of separator panel 26, the same given volume of air passes through a second portion 59 of separator panel 26. As a result, the air flow rate of air passing through the second portion 59 of separator panel 26 is increased relative to the air flow rate prior to the blocking of the air from passing through first portion 57 of separator panel 26. In this exemplary manner, the effectiveness of the separation of the debris from the air passing through separator panel 26 may be increased, as separator tubes 28 including respective vanes 46 may be more effective at the air flow rate at which the air flows through second portion 59 of separator panel 26.

Figure 9:
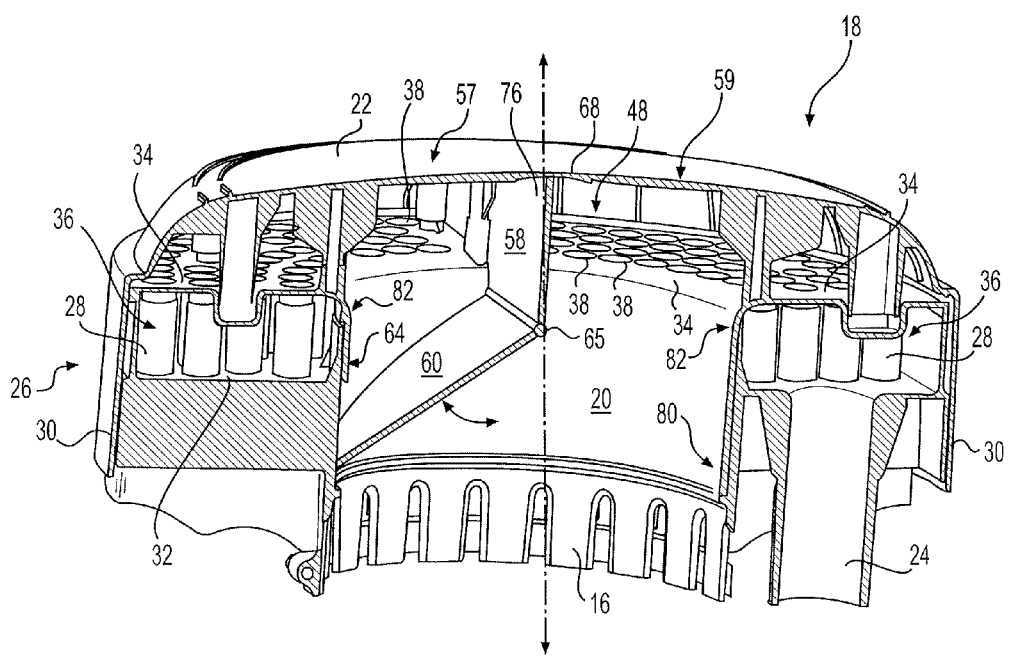
FIG. 9 is a partial perspective section view of an exemplary embodiment of a precleaner and an exemplary embodiment of an apparatus for partially blocking air flow in the precleaner.
Figure 10:
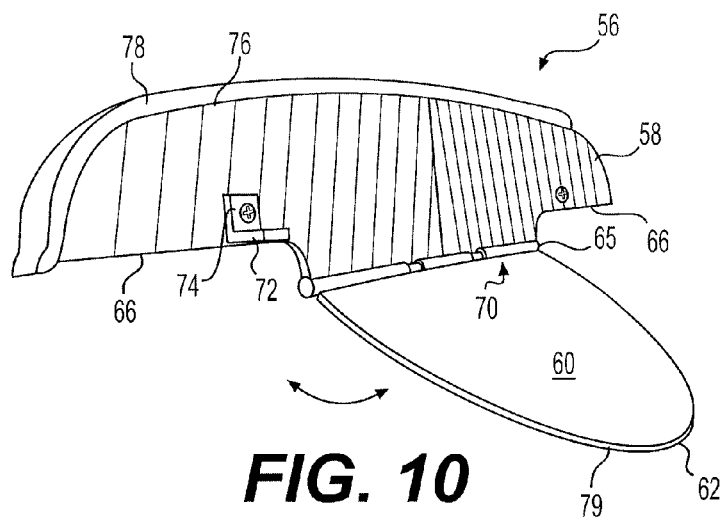
FIG. 10 is a perspective view of an exemplary embodiment of an apparatus for partially blocking air flow in a precleaner.
Figure 11:
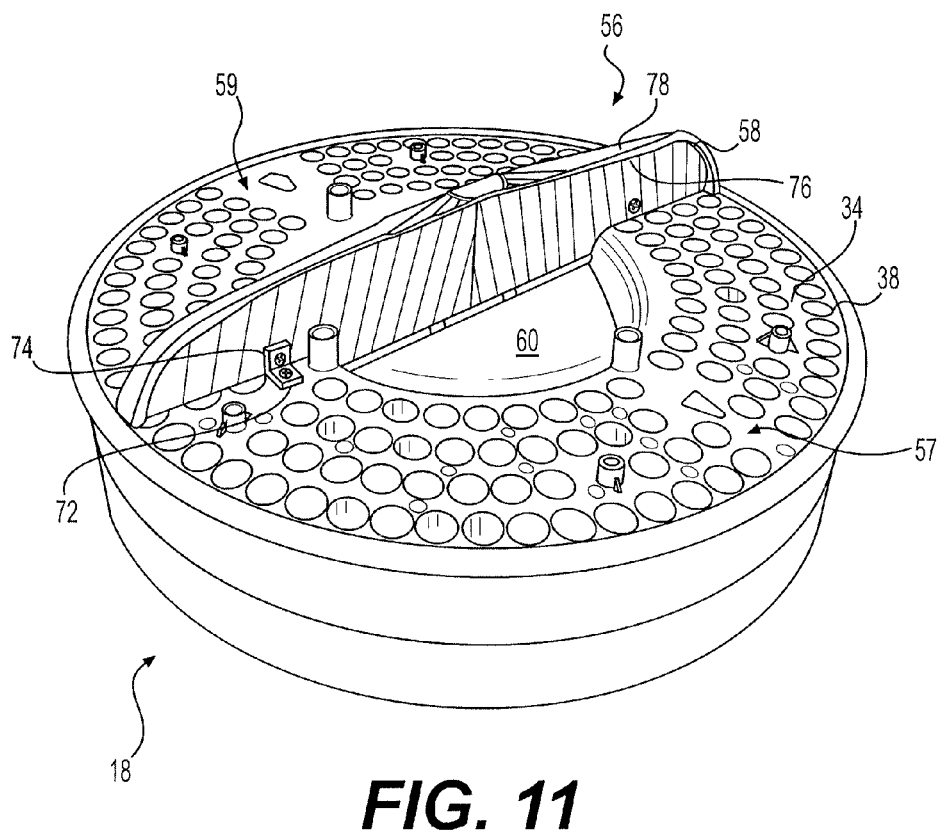
FIG. 11 is a perspective view of a portion of an exemplary embodiment of a precleaner and an exemplary embodiment of an apparatus for partially blocking air flow in a precleaner.

In the exemplary embodiments shown in FIGS. 8-11, exemplary apparatus 56 for partially blocking airflow in precleaner 18 includes a stationary barrier 58 configured to be mounted in precleaner 18, for example, as shown in FIGS. 9 and 11. Exemplary apparatus 56 also includes a movable barrier 60 coupled to stationary barrier 58. Moveable barrier 60 is configured to move between an open position and a closed position (e.g., as shown in FIG. 9) in response to changes in the air flow rate through precleaner 18. For example, when the air flow rate through precleaner 18 reaches a threshold air flow rate, movable barrier 60 moves from the closed position toward the open position, and when the air flow rate through precleaner 18 drops below the threshold air flow rate, movable barrier 60 (when already in the open position) moves from the open position toward the closed position. For example, when the air flow rate through precleaner 18 reaches the threshold air flow rate, movable barrier 60 moves from the closed position toward the open position, so that movable barrier 60 is substantially, completely open, or such that moveable barrier 60 is substantially coplanar with stationary barrier 58. When the air flow rate through precleaner 18 drops below the threshold air flow rate, for example, movable barrier 60 moves from the open position toward the closed position, so that an edge 62 of movable barrier 60 opposite stationary barrier 58 abuts against an inner portion 64 of sleeve 20, so that air is substantially prevented from flowing through a significant portion (e.g., up to about 75 percent) of the cross-section of sleeve 20 and into intake conduit 16.

As shown in FIG. 9, exemplary stationary barrier 58 extends across the opening of sleeve 20 from one side (e.g., one circumferential side) of flange 30 of cover 22 to a second, generally opposite side (e.g., a diametrically opposed side) of flange 30 of cover 22. A lower edge 66 of stationary barrier 58 abuts against upper face 34 of separator panel 26. For example, in the exemplary embodiment shown, stationary barrier 58 generally bifurcates upper chamber 48 between upper face 34 of separator panel 26 and the interior surface 68 of cover 22. For example, as shown, stationary barrier 58 is mounted in precleaner 18, such that scavenge port 24 and movable barrier 60 are on opposite sides of stationary barrier 58.

In the exemplary embodiment shown, moveable barrier 60 is coupled to stationary barrier 58, such that movable barrier 60 swings or oscillates with respect to stationary barrier 58. For example, movable barrier 60 may be coupled to stationary barrier 58 via a hinge 65. According to some embodiments, movable barrier 60 is biased toward the closed position, for example, as shown in FIG. 9. Exemplary movable barrier 60 is shaped so that when movable barrier 60 is in the closed position, edge 62 fits snugly against inner portion 64 of sleeve 20, so that air is substantially prevented from flowing between edge 62 and inner portion 64. As a result, when in the closed position and in combination with stationary barrier 58, movable barrier 60 prevents air from flowing through first portion 57 of separator panel 26 and into sleeve 20. Thus, when the engine draws air into air intake system 10 and movable barrier 60 is in the closed position, for a given volume and flow rate of intake air, all of the air passes through second (unblocked) portion 59 of separator panel 26 instead of the entire separator panel 26. As a result, the air flow rate of air passing through second portion 59 of separator panel 26 is greater than the air flow rate of air passing through the entire separator panel 26 when movable barrier 60 is in the open position.

According to some embodiments, movable barrier 60 is coupled to stationary barrier 58 such that movable barrier 60 is biased toward the closed position by a biasing member 70. For example, biasing member 70 may be configured to allow movable barrier 60 to move toward the open position when the air flow rate through precleaner 18 reaches the threshold air flow rate, for example, an air flow rate that corresponds to an air flow rate sufficient for separator tubes 28 to effectively separate debris from air entering separator panel 26 with movable barrier 60 in the open position. According to some embodiments, biasing member 70 may include a spring or other known biasing members.

According to some embodiments, stationary barrier 58 is coupled to one or more of upper face 34 of separator panel 26 and interior surface 68 of cover 22. For example, as shown in FIGS. 10 and 11, exemplary stationary barrier 58 includes one or more bosses 72 configured to couple stationary barrier 58 to an interior surface of precleaner 18. For example, boss 72 may be a bracket 74 (e.g., an L-shaped bracket) that may be secured to one or more of upper face 34 of separator panel 26 and interior surface 68 of cover 22 via at least one of fasteners and adhesives. According to some embodiments, apparatus 56 may be added to an existing precleaner, for example, by coupling or mounting stationary barrier 58 to a portion of the interior of the precleaner.

According to some embodiments, edge 76 of stationary barrier 58 opposite moveable barrier 60 may include a seal member 78 (see e.g., FIG. 10) configured to provide a seal between edge 76 and interior surface 68 of cover 22 of precleaner 18. According to some embodiments, edge 62 of movable barrier 60 may include a seal member 79 configured to provide a seal between edge 62 and inner portion 64 of sleeve 20. Such seal members may be prefabricated and coupled to stationary barrier 58 and/or movable barrier 60, or may be added to the edges during assembly of apparatus 56 in precleaner 18.

In the exemplary embodiments shown, stationary barrier 58 and movable barrier 60 are each substantially planar. However, it is contemplated that stationary barrier 58 and/or movable barrier 60 may be non-planar. Different configurations of stationary barrier 58 and/or movable barrier 60 may be provided, for example, in order to increase or reduce the portion of the air flow through separator panel 26 that is blocked. According to some embodiments, stationary barrier 58 may be positioned relative to the opening of sleeve 20 to increase or reduce the portion of the air flow through separator panel 26 that is blocked.

According to some embodiments, for example, as shown in FIG. 9, precleaner 18 may include sleeve 20 configured to be coupled to intake conduit 16 associated with an internal combustion engine. Exemplary precleaner 18 may also include separator panel 26 coupled to sleeve 20 and configured to separate debris from air flowing through separator panel 26 and into intake conduit 16. Exemplary precleaner 18 shown in FIG. 9 also includes cover 22 coupled to sleeve 20, and apparatus 56 for partially blocking airflow in precleaner 18. Exemplary apparatus 56 shown includes stationary barrier 58 mounted in precleaner 18, and movable barrier 60 coupled to stationary barrier 58 and configured to move between the open position and the closed position in response to changes in an air flow rate of air passing through precleaner 18. In the exemplary embodiment shown, when movable barrier 60 moves from the open position toward the closed position, flow of air through first portion 57 of separator panel 26 is reduced, and an air flow rate of air passing through second portion 59 of separator panel 26 is increased. Further, when movable barrier 60 moves from the closed position toward the open position, an air flow rate of air passing through first portion 57 of separator panel 26 is substantially the same as the air flow rate of air passing through second portion 59 of separator panel 26.

For example, as shown in FIG. 9, sleeve 20 includes a first end 80 configured to be proximate intake conduit 16 and a second end 82 opposite first end 80 of sleeve 20. Moveable barrier 60 is received in second end 82 of sleeve 20 and is configured to move between the closed position, in which moveable barrier 60 at least partially blocks air passing through first portion 57 of separator panel 26 from entering intake conduit 16, and the open position, in which movable barrier 60 does not block air passing through first portion 57 of separator panel 26 entering intake conduit 16.

According to some embodiments, a method for removing debris from an air flow entering intake conduit 16 of an internal combustion engine may include flowing the air flow through separator panel 26, which is configured to separate debris from the air flow. The method may also include reducing the flow of air through first portion 57 of separator panel 26 to increase flow of air through second portion 59 of separator panel 26, and separating debris from the air flowing through second portion 59 of separator panel 26. Thereafter, or during, the method may include removing the debris from separator panel 26 via scavenge port 24. For example, reducing the flow of air through first portion 57 of separator panel 26 may include biasing movable barrier 60 toward a closed position to reduce the flow of air through first portion 57 of separator panel 26 as long as the air flow rate through separator panel 26 is below a threshold air flow rate. According to some embodiments, upon reaching the threshold air flow rate, the method may further include increasing the air flow through first portion 57 of separator panel 26 via movement of movable barrier 60 toward an open position.

INDUSTRIAL APPLICABILITY

The apparatus and precleaner disclosed herein may be used to remove particulates from air entering a machine that relies on air flow for operation. For example, internal combustion engines combine air and fuel for combustion to develop power that may be used to perform work, such as propelling a vehicle and/or operating other devices associated with the vehicle. The apparatus and precleaner may be used to prevent entry of particulates into the internal combustion engine to reduce or prevent contamination of the oil and other parts of the engine that may lead to premature wear or damage to parts of the internal combustion engine.

According to some embodiments, apparatus 56 may be used to block a portion of air flow through a precleaner. This may serve to increase the effectiveness of the separation of debris from the air as it passes through the precleaner, for example, when the engine is operating at a level below the rated level. For example, for a given volume of air being drawn into an air intake system, by blocking or preventing air from passing through a first portion of the precleaner separator panel, the same given volume of air passes through a second portion of separator panel. As a result, the air flow rate of air passing through the second portion of separator panel is increased relative to the air flow rate prior to the blocking of the air from passing through the first portion of separator panel. In this exemplary manner, the effectiveness of the separation of the debris from the air passing through the precleaner separator panel may be increased, for example, because separator tubes of the separator panel may be more effective at the air flow rate at which the air flows through the second portion of the separator panel when the first portion is blocked.

It will be apparent to those skilled in the art that various modifications and variations can be made to the exemplary disclosed apparatus and precleaners. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A precleaner for an internal combustion engine, the precleaner comprising:
    a sleeve configured to be coupled to an intake conduit associated with an internal combustion engine;
    a separator panel coupled to the sleeve and configured to separate debris from air flowing through the separator panel and into the intake conduit;
    a cover coupled to the sleeve; and
    an apparatus for partially blocking airflow in the precleaner, the apparatus including:
    a stationary barrier mounted in the precleaner, and
    a movable barrier coupled to the stationary barrier and configured to move between an open position and a closed position in response to changes in an air flow rate of air passing through the precleaner,
    wherein, when the movable barrier moves from the open position toward the closed position, flow of air through a first portion of the separator panel is reduced, and an air flow rate of air passing through a second portion of the separator panel is increased, and wherein, when the movable barrier moves from the closed position toward the open position, an air flow rate of air passing through the first portion of the separator panel is substantially the same as the air flow rate of air passing through the second portion of the separator panel.

2. The precleaner of claim 1, wherein the sleeve includes a first end configured to be proximate the intake conduit and a second end opposite the first end of the sleeve, and wherein the moveable barrier is received in the second end of the sleeve and is configured to move between the closed position, in which the moveable barrier at least partially blocks air passing through the first portion of the separator panel from entering the intake conduit, and the open position, in which the movable barrier does not block air passing through the first portion of the separator panel from entering the intake conduit.

3. The precleaner of claim 1, wherein the stationary barrier extends between an upper surface of the separator panel and an interior surface of the cover and across an end of the sleeve.

4. The precleaner of claim 3, further including a seal member providing a seal between the stationary barrier and the interior surface of the cover.

5. The precleaner of claim 3, wherein the stationary barrier is coupled to at least one of an upper surface of the separator panel and an interior surface of the cover.

6. The precleaner of claim 1, wherein the separator panel includes a plurality of separator tubes configured to promote separation of debris from air entering the precleaner via the separator panel.

7. The precleaner of claim 6, wherein the separator panel includes a scavenge port in flow communication with the separator tubes, and wherein the scavenge port is configured to facilitate removal from the precleaner of debris separated from the air by the separator tubes.

8. The precleaner of claim 7, wherein the stationary barrier is mounted in the precleaner, such that the scavenge port and the movable barrier are on opposite sides of the stationary barrier.

9. A method for removing debris from an air flow entering an intake conduit of an internal combustion engine, the method comprising:
    flowing the air flow through a separator panel configured to separate debris from the air flow;
    moving a movable barrier between an open position and a closed position in response to changes in an air flow rate of air passing through the separator panel;
    reducing flow of air through a first portion of the separator panel by moving the movable barrier to a closed position to increase flow of air through a second portion of the separator panel;
    moving the movable barrier from the closed position toward the open position such that an air flow rate of air passing through the first portion of the separator panel is substantially the same as the air flow rate of air passing through the second portion of the separator panel;
    separating debris from the air flowing through the second portion of the separator panel; and
    removing the debris from the separator panel via a scavenge port.

10. The method of claim 9, wherein reducing the flow of air through the first portion of the separator panel includes biasing the movable barrier toward a closed position to reduce the flow of air through the first portion of the separator panel as long as the air flow rate through the separator panel is below a threshold air flow rate.

11. The method of claim 10, further including, upon reaching the threshold air flow rate, increasing the air flow through the first portion of the separator panel via movement of the movable barrier toward an open position.

* * * * *